United States Patent
Capecelatro et al.

(10) Patent No.: US 12,175,972 B1
(45) Date of Patent: Dec. 24, 2024

(54) DISTRIBUTED ARCHITECTURE FOR PREMISES AUTOMATION

(71) Applicant: Josh.ai, Inc., Denver, CO (US)

(72) Inventors: Alex Nathan Capecelatro, Los Angeles, CA (US); Timothy Earl Gill, Denver, CO (US); Edward John McKenna, Jr., Denver, CO (US); Derek Murphy, Highlands Ranch, CO (US); Scott Lon Allen, Denver, CO (US)

(73) Assignee: Josh.ai, Inc., Denver, CO (US)

( * ) Notice: Subject to any disclaimer, the term of this patent is extended or adjusted under 35 U.S.C. 154(b) by 193 days.

(21) Appl. No.: 17/504,840

(22) Filed: Oct. 19, 2021

Related U.S. Application Data

(60) Provisional application No. 63/109,239, filed on Nov. 3, 2020.

(51) Int. Cl.
| | |
|---|---|
| *G10L 15/22* | (2006.01) |
| *H04R 1/40* | (2006.01) |
| *H04R 3/12* | (2006.01) |
| *G10L 15/08* | (2006.01) |

(52) U.S. Cl.
CPC .............. *G10L 15/22* (2013.01); *H04R 1/403* (2013.01); *H04R 1/406* (2013.01); *H04R 3/12* (2013.01); *G10L 2015/088* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 4,304,079 A | 12/1981 | Thorsten | |
| 6,133,843 A | 10/2000 | Davidson | |
| 6,250,162 B1 | 6/2001 | Amaike | |
| 10,078,786 B2 | 9/2018 | Richardson | |
| 11,060,705 B1 | 7/2021 | Danesh | |
| 11,315,556 B2* | 4/2022 | Smith | G10L 15/22 |
| 11,756,541 B1* | 9/2023 | Mrani | G06N 20/00 |
| | | | 704/257 |
| 2003/0043883 A1 | 3/2003 | Okuzono | |
| 2003/0159910 A1 | 8/2003 | Caldwell | |
| 2003/0210551 A1 | 11/2003 | Sevack | |
| 2007/0268506 A1 | 11/2007 | Zeldin | |
| 2009/0056264 A1 | 3/2009 | Rosskamp | |
| 2009/0206059 A1* | 8/2009 | Kiko | G05F 1/66 |
| | | | 218/143 |
| 2010/0148028 A1 | 6/2010 | Hand | |
| 2013/0201316 A1* | 8/2013 | Binder | H04L 67/12 |
| | | | 701/2 |
| 2015/0264780 A1 | 9/2015 | Harris | |
| 2017/0229811 A1 | 8/2017 | Clark | |

(Continued)

*Primary Examiner* — Mark Villena
(74) *Attorney, Agent, or Firm* — Van Pelt, Yi & James LLP

(57) ABSTRACT

An audio input associated with a human utterance received at the audio input device is received from a respective one of a plurality of audio input devices. Each of the plurality of audio input devices is located in a corresponding physical location within the premises. The audio input is mapped to an intent. An audible verbal response associated with the intent is provided as audio output via a selected one or more of a plurality of audio output devices. Each of the plurality of audio output devices is located in an associated physical location within the premises.

20 Claims, 9 Drawing Sheets

(56) References Cited

U.S. PATENT DOCUMENTS

| | | |
|---|---|---|
| 2018/0116036 A1 | 4/2018 | Snyder |
| 2019/0064914 A1 | 2/2019 | Krishnakumar |
| 2019/0311721 A1* | 10/2019 | Edwards ................. G10L 17/06 |
| 2019/0362718 A1* | 11/2019 | Bhargava ................ G10L 15/22 |
| 2020/0196141 A1 | 6/2020 | Baker |
| 2020/0258512 A1* | 8/2020 | Smith ..................... G06F 3/167 |
| 2020/0312317 A1* | 10/2020 | Kothari ................ H04L 67/125 |
| 2023/0161917 A1 | 5/2023 | Lee |

* cited by examiner

DISTRIBUTED ARCHITECTURE FOR PREMISES AUTOMATION

CROSS REFERENCE TO OTHER APPLICATIONS

This application claims priority to U.S. Provisional Patent Application No. 63/109,239 entitled DISTRIBUTED ARCHITECTURE FOR PREMISES AUTOMATION filed Nov. 3, 2020 which is incorporated herein by reference for all purposes.

BACKGROUND OF THE INVENTION

One use for technology is to establish a system of control. In premises automation, for example home automation, a system controls various aspects of the premises such as lighting, music, and heating, ventilation and air conditioning (HVAC) based in part on user input. To control each aspect of the premises automation system may be overwhelming, expensive, and/or time consuming. It would be useful to have easier ways to maintain a system of control.

BRIEF DESCRIPTION OF THE DRAWINGS

Various embodiments of the invention are disclosed in the following detailed description and the accompanying drawings.

DETAILED DESCRIPTION

Figure 1:
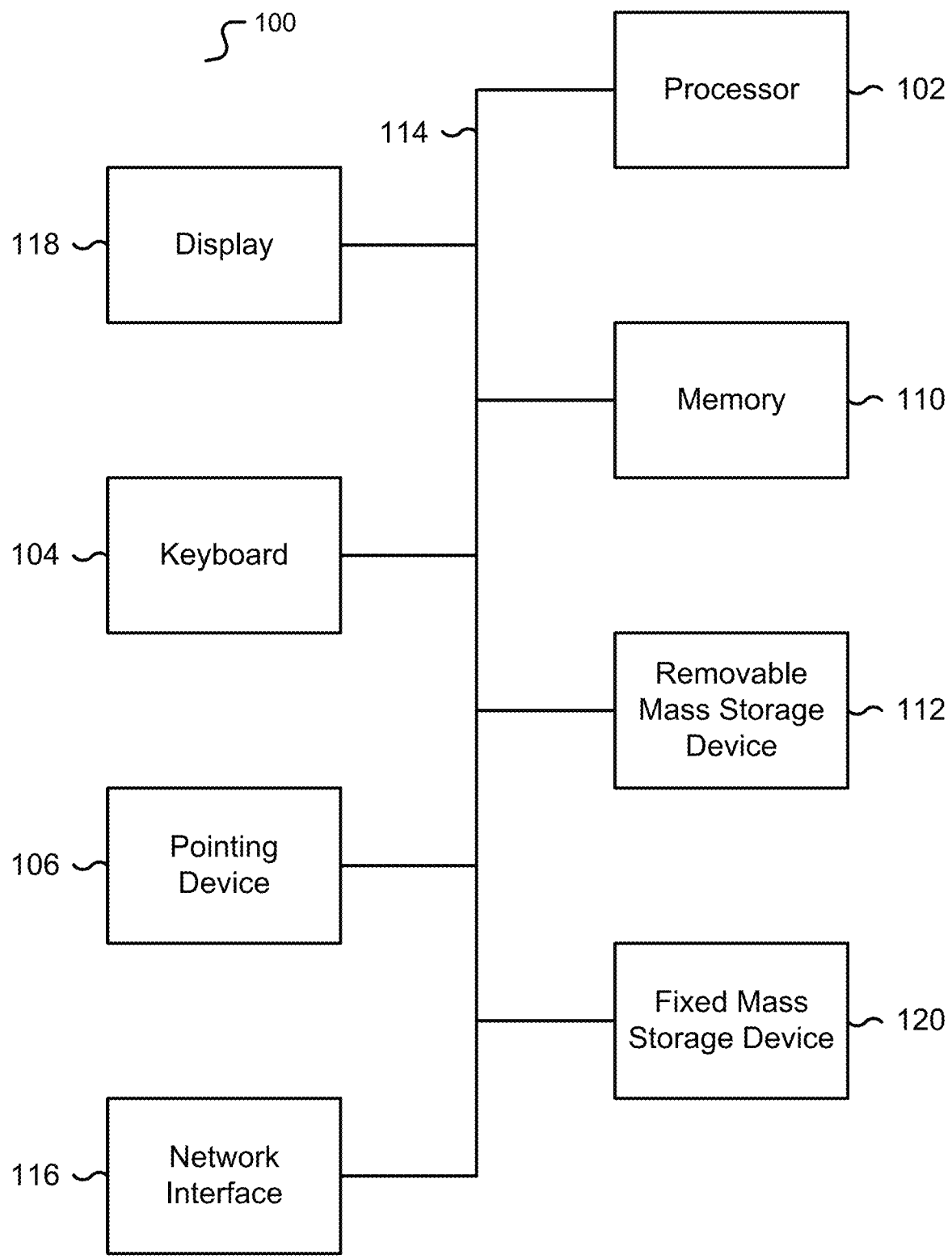
FIG. 1 is a functional diagram illustrating a programmed computer/server system for control of complex input in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A modular and/or distributed architecture premises automation to maintain a system of control is disclosed. As referred to herein, a 'distributed architecture' without limitation is any architecture that may not have a sensor device, a processor-cloud interface, and a feedback device directly coupled together. In one embodiment, a distributed architecture is an audio system wherein the sensor device is a microphone and the feedback device is a speaker. Many existing premises may include sound systems and/or speakers used for traditional entertainment/communication services, for example smart sound systems.

With a distributed architecture, an audio system may include distributed microphones and/or an efficient integration with existing premises sound systems. Audio systems may be important for premises automation for simple and intuitive control, for example having a user state out loud "please turn off the master bedroom lights at 8 pm tonight" and/or a system responding "got it, lights in the master bedroom will be turned off in a couple hours." Premises automation also includes controlling audio systems such as music and/or television audio channels.

In one embodiment, the processor and/or cloud network connection is housed in a core device, apart from the sensor devices and/or feedback devices. Providing high availability feedback for core devices, at least in part for greater reliability, is disclosed.

Providing at least two channels for feedback is disclosed. In one embodiment, one of the feedback channels is termed a 'voice-link' that provides a hardware-based audio output channel. In one embodiment, one of the feedback channels is termed a 'voice-cast' that provides a network-based audio output channel. The 'voice-cast' channel interface may be enhanced to provide feedback through less conventional devices, for example the speaker in a television, refrigerator, microwave oven, and/or doorbell.

Providing greater sensor reliability is disclosed. In one embodiment, a 'wake word' is used to awaken the premises automation system for audio or video input, for example using the word "Josh" or "Alexa". Greater sensor reliability may be provided by allowing a sensor device to detect a wake word and fine tuning the detection with a core device.

FIG. 1 is a functional diagram illustrating a programmed computer/server system for control of complex input in accordance with some embodiments. As shown, FIG. 1 provides a functional diagram of a general purpose computer system programmed to provide premises automation in accordance with some embodiments. As will be apparent, other computer system architectures and configurations can be used for premises automation.

Computer system 100, which includes various subsystems as described below, includes at least one microprocessor subsystem, also referred to as a processor or a central processing unit ("CPU") 102. For example, processor 102 can be implemented by a single-chip processor or by multiple cores and/or processors. In some embodiments, processor 102 is a general purpose digital processor that controls the operation of the computer system 100. Using instructions retrieved from memory 110, the processor 102 controls the reception and manipulation of input data, and the output and display of data on output devices, for example display and graphics processing unit (GPU) 118.

Processor 102 is coupled bi-directionally with memory 110, which can include a first primary storage, typically a random-access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data, and objects used by the processor 102 to perform its functions, for example, programmed instructions. For example, primary storage devices 110 can include any suitable computer-readable storage media, described below, depending on whether, for example, data access needs to be bi-directional or uni-directional. For example, processor 102 can also directly and very rapidly retrieve and store frequently needed data in a cache memory, not shown. The processor 102 may also include a coprocessor (not shown) as a supplemental processing component to aid the processor and/or memory 110.

A removable mass storage device 112 provides additional data storage capacity for the computer system 100, and is coupled either bi-directionally (read/write) or uni-directionally (read-only) to processor 102. For example, storage 112 can also include computer-readable media such as flash memory, portable mass storage devices, holographic storage devices, magnetic devices, magneto-optical devices, optical devices, and other storage devices. A fixed mass storage 120 can also, for example, provide additional data storage capacity. One example of mass storage 120 is an eMMC or microSD device. In one embodiment, mass storage 120 is a solid-state drive connected by a bus 114. Mass storages 112, 120 generally store additional programming instructions, data, and the like that typically are not in active use by the processor 102. It will be appreciated that the information retained within mass storages 112, 120 can be incorporated, if needed, in standard fashion as part of primary storage 110, for example RAM, as virtual memory.

In addition to providing processor 102 access to storage subsystems, bus 114 can be used to provide access to other subsystems and devices as well. As shown, these can include a display monitor 118, a communication interface 116, a touch (or physical) keyboard 104, and one or more auxiliary input/output devices 106 including an audio interface, a sound card, microphone, audio port, audio input device, audio card, speakers, a touch (or pointing) device, and/or other subsystems as needed. Besides a touch screen, the auxiliary device 106 can be a mouse, stylus, track ball, or tablet, and is useful for interacting with a graphical user interface.

The communication interface 116 allows processor 102 to be coupled to another computer, computer network, or telecommunications network using a network connection as shown. For example, through the communication interface 116, the processor 102 can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Throughout this specification, "network" refers to any interconnection between computer components including the Internet, Bluetooth, WiFi, 3G, 4G, 4GLTE, GSM, Ethernet, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous and/or heterogeneous systems and/or groups of systems together. Additional mass storage devices, not shown, can also be connected to processor 102 through communication interface 116.

An auxiliary I/O device interface, not shown, can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: flash media such as NAND flash, eMMC, SD, compact flash; magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that can be executed using an interpreter.

The computer/server system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems.

Other computer architectures having different configurations of subsystems can also be utilized.

Figure 2A:
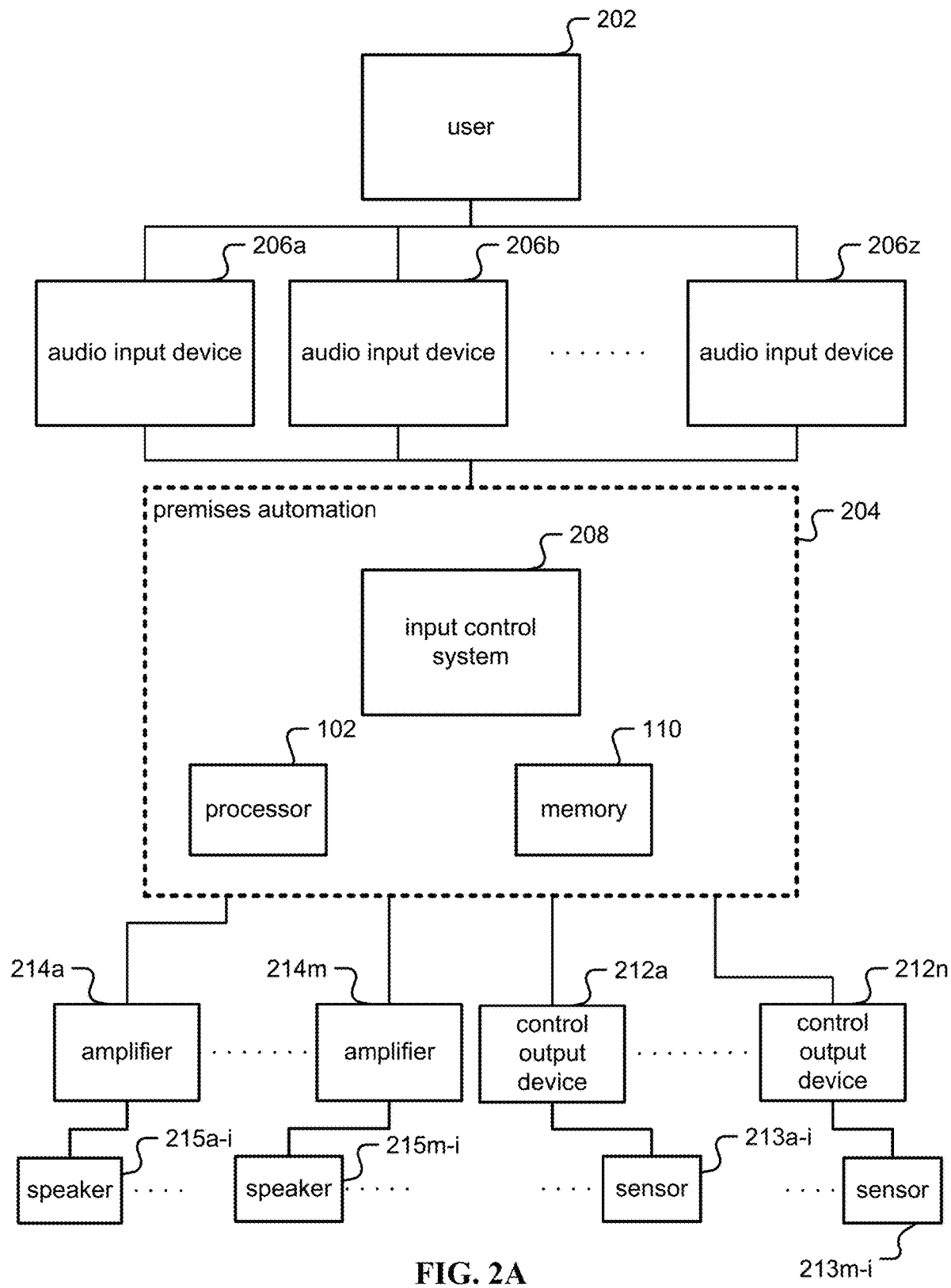
FIG. 2A is a block diagram illustrating an embodiment of a system for premises automation.

FIG. 2A is a block diagram illustrating an embodiment of a system for premises automation. User (202) is coupled to premises automation system (204), either through distributed sensor input devices (206), for example, audio input devices, here shown with three devices (206*a*), (206*b*), and (206*z*), if by way of speech, or directly to the input control system (208) if by way of written word, for example, by typing or texting on an associated app.

In one embodiment, premises automation system (204) is a computer system as shown in FIG. 1 and includes processor (102) and memory (110). In one embodiment, the premises automation system (204) is a mobile phone, computer, or dedicated smart home device. Without limitation, throughout this specification the dedicated smart home device referenced herein as a "core" device is illustrated as the premises automation system (204). In one embodiment, a physical phone, touchscreen, swipe-based keyboard, and/or virtual keyboard (104) is included for typing or texting. The audio input device(s) (206) may be coupled and/or part of the input control system (208) as well.

After interpreting programming, the input control system (208) may be coupled to one or more control output devices (212), here shown with more than two devices (212*a*), . . . , (212*n*). The control output devices (212) may be a single smart home hub (212*a*) and/or may include additional smart home devices for direct control. One or more other sensors (213) may be part of any control output device (212).

To cue feedback from premises automation core (204) to the user giving speech commands to one or more of the audio input devices (206), an existing distributed network of speakers (215) may be used by interfacing with an existing set of associated amplifiers (214). Premises automation core (204) may also playback music and/or television/media audio through the existing set of speakers and/or smart speakers (215).

Figure 2B:
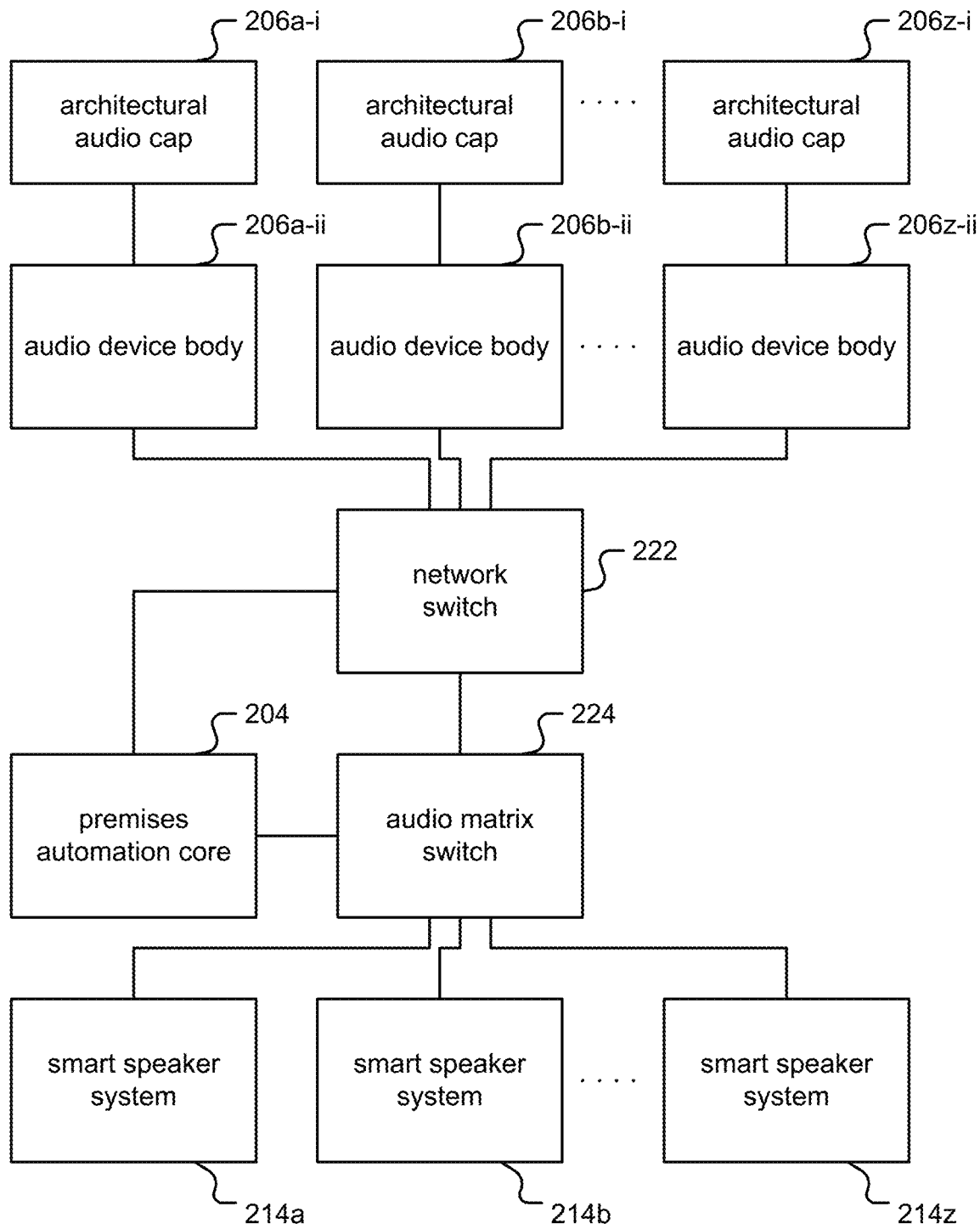
FIG. 2B is a block diagram illustrating an embodiment of an audio system for premises automation recommendations.

FIG. 2B is a block diagram illustrating an embodiment of an audio system for premises automation recommendations. In one embodiment, the audio system in FIG. 2B is at least part of the system in FIG. 2A to provide feedback to speech commands and/or provide music or media audio as a result of said speech commands.

An improvement for a premises automation system is having a large number of distributed audio input devices (206) so as to permit a user to communicate with the premises automation system from any region of the premises. In order to minimize construction costs and in order to maximize aesthetic compatibility with most rooms of a residential/commercial/industrial premises, the audio input devices (206) are "modular" and/or small. Without limitation, the input devices (206) may be video input devices, audio/video input devices, and/or devices with a different sensor other than an audio or video sensor; the example of audio is given herein by way of example.

In one embodiment, a given audio input device (206*a*) is made up of an architectural sensor, wherein "architectural" is defined herein as a device with a low-profile that may be compatible with a broad aesthetic and suitable for nearly any room, for example, a device less than 40 mm in length, less then 40 mm in width, and less than 4 mm thick from a finished surface, such as a finished wall surface. One example of an architectural sensor is one or more microphones, for example, a far-field microphone and/or microphone array. Other examples of an architectural sensor include: a camera, a motion sensor, a heat sensor, and another sensor to detect sensory or other input associated with a human present in the physical space around the device (206*a*).

In one embodiment, the input device (206*a*) includes a privacy switch that is itself architectural and low profile, for example, less than 0.5 mm thick. When the privacy switch is engaged, the humans present in a physical space in which the input device (206*a*) and an associated sensor are deployed are given an assurance of stronger privacy, for example, because the physical circuit path that electrically couples an output signal generated by the sensor to a premises automation system processing component is interrupted. In one embodiment, when the physical circuit path is interrupted, a human-observable indicator is given, for example, a painted switch position in the "privacy on" position, a visual cue such as one or more LEDs, and/or an audio cue such as one or more tones.

In one embodiment, the audio input device (206*a*) is modular, being made up of a low-profile architectural audio cap portion (206*a-i*) that is low-profile and in a given room, and an audio device body portion (206*a-ii*) which is recessed within a wall/ceiling/floor and interfaces with the cap (206*a-i*) inside said wall/ceiling/floor. The audio input device (206*a*) is modular in the sense that caps (206*a-i*) with other sensors, styles, and/or functionality may be interchanged by a user once a construction team has embedded the audio device body portion (206*a-ii*) in a wall/ceiling/floor.

In one embodiment, the audio device bodies (206*a-ii*), (206*b-ii*), . . . (206*z-ii*) are connected through a network connection, for example, an Ethernet connection such as a PoE (Power over Ethernet) coupling, to a network switch (222) or collection of network switches (222). The network switch (222) is also coupled to a premises automation core (204), also shown in FIG. 2A, and an audio matrix switch (224). An audio matrix switch (224) allows configuration of one or more audio inputs to be connected to one or more audio outputs. The audio outputs from the audio matrix switch include one or more smart speaker/amplifier systems (216), here shown to include at least three (216*a*), (216*b*), and (216*z*), also referred to as the amplifier (214) and speaker (215) combination in FIG. 2A.

Figure 3A:
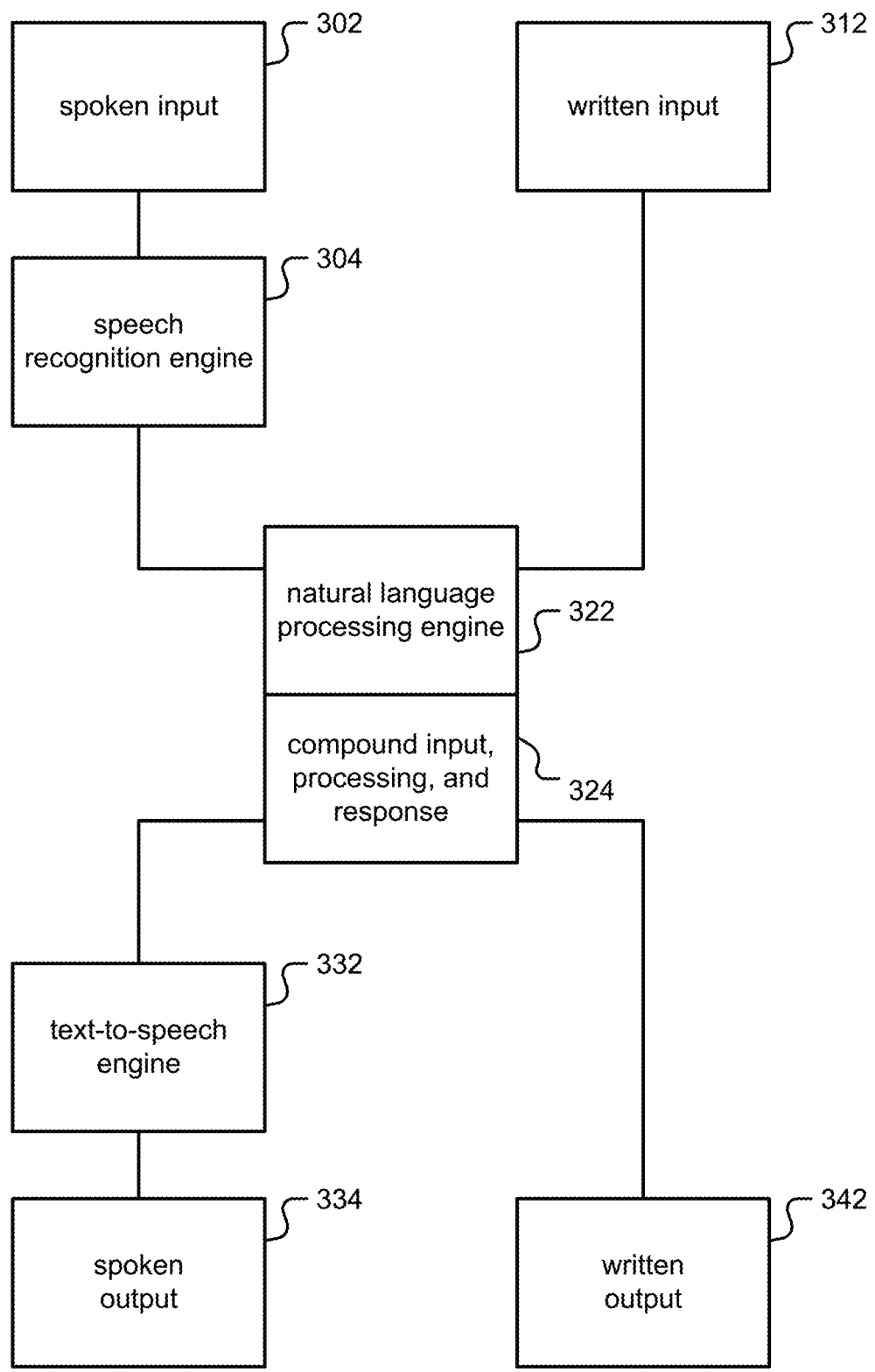
FIG. 3A is a block diagram illustrating an embodiment of a system for complex input speech and written processing.

FIG. 3A is a block diagram illustrating an embodiment of a system for complex input speech and written processing. In one embodiment, the system of FIG. 3A is at least part of the premises automation system (204) and/or control output device (212*a*) in FIG. 2A.

As FIG. 3A illustrates, input may be spoken and/or written and is referred to herein as an "utterance", and output may be spoken and/or written. Spoken input (302) is processed by a speech recognition engine (304) before being passed to the natural language processing engine (322). Written input (312) may be processed directly by the natural language processing engine (322). In one embodiment, written input (312) may correct, add, edit, and/or delete the resultant input from spoken input (302) and speech recognition engine (304).

Note that in some cases, the spoken input (302) and/or written input (312) may have little or no punctuation, capitalization, and/or proper nouns recognized. Natural language processing engine (322) applies rules and couples the system for complex/compound input, processing, and response (324), referred to herein as "intent". User notification of responses includes written output (342) from system (324), and may include a text-to-speech engine (332) to provide spoken output (334) as well.

Figure 3B:
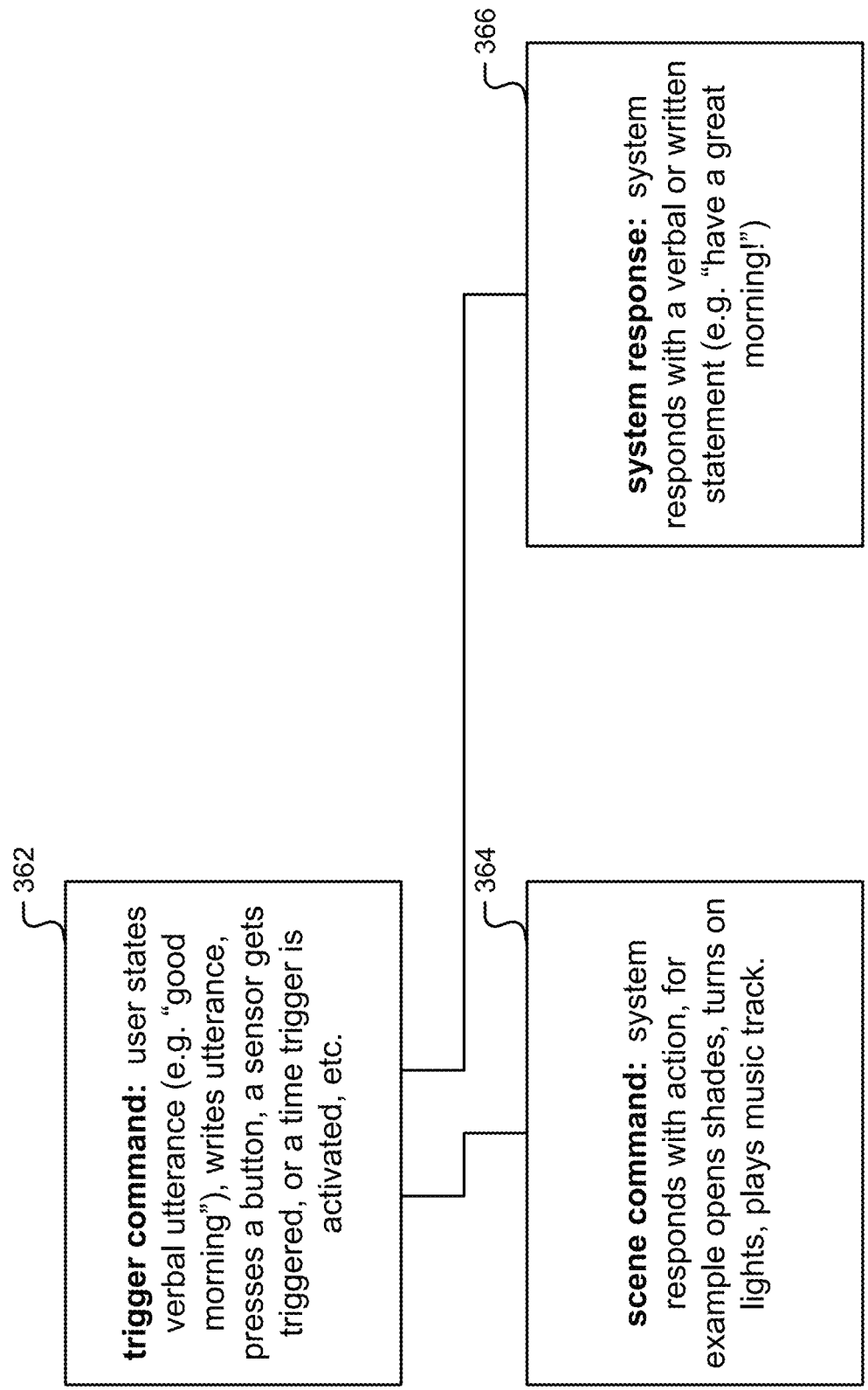
FIG. 3B is an illustration of a trigger and corresponding scene command.

FIG. 3B is an illustration of a trigger and corresponding scene command. In one embodiment, the illustration of FIG. 3B is carried out by the system (204) of FIG. 2A.

Trigger command (362) is an action that triggers a scene. In the example of FIG. 3B, the action includes: a voice command, for example, a user that says "Good morning"; a button press, for example, a user that presses a button titled "Morning"; a triggered sensor; and/or a triggered time, for example, based on a schedule. In each case the trigger indicates a "begin good morning scene" intent.

After the system is triggered (362), the system may optionally respond with a "scene" command (364). Examples given in FIG. 3B include opening the shades, turning on the lights, and playing a musical track. A scene command, also referred to herein as a "premises automation scene," is a convenient way to refer to one or more aspects of premises automation. For example, a "good morning" command may include opening the shades, turning on the lights, and playing a musical track suitable for mornings because the user prefers to start their morning with these aspects of premises automation. After the system is triggered (362), a system response (366) may optionally be issued by responding with a written or verbal output, for example, "Have a great morning!"

Figure 4:
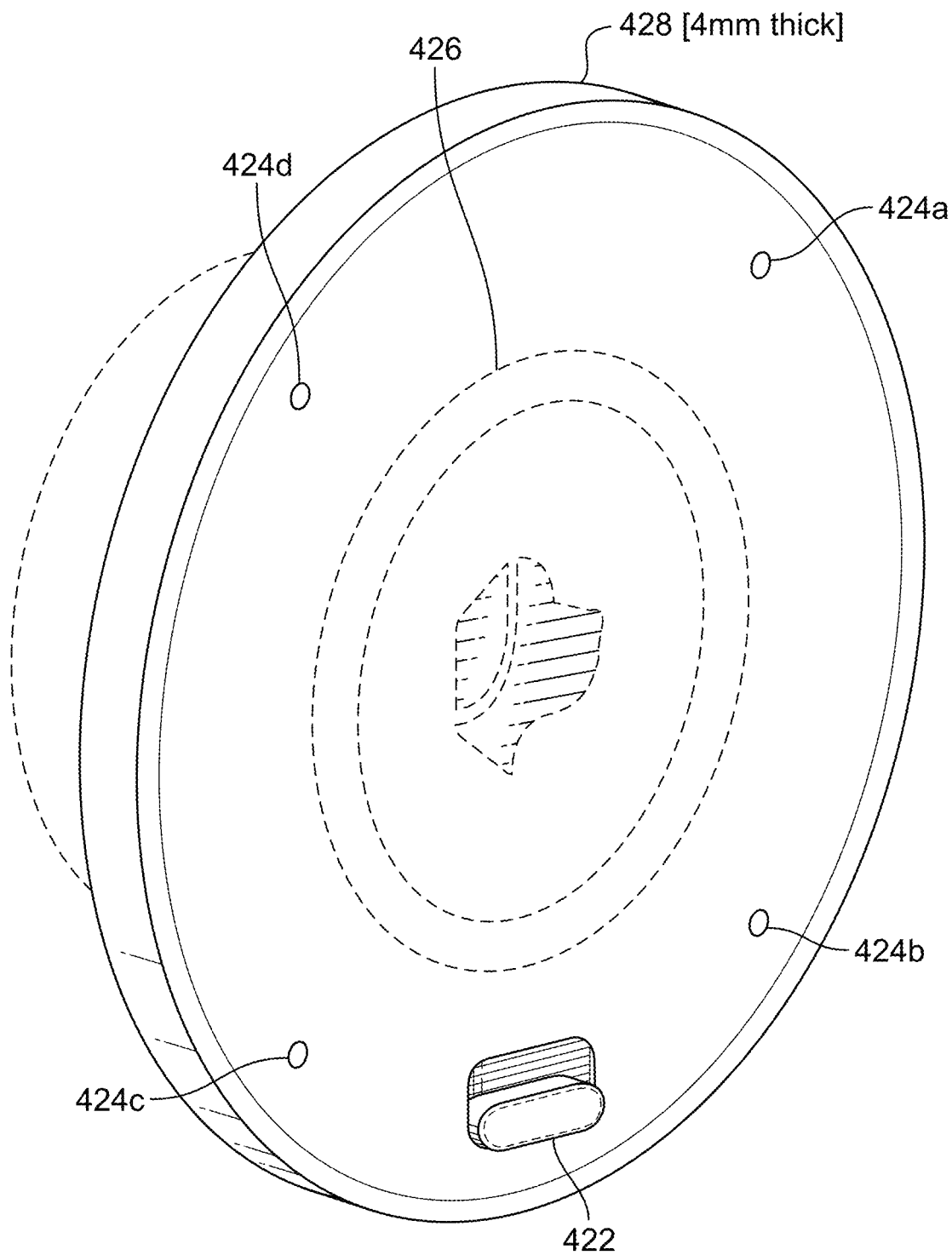
FIG. 4 is an illustration of an embodiment for an architectural audio/microphone cap.

FIG. 4 is an illustration of an embodiment for an architectural audio/microphone cap. In one embodiment, the illustration of FIG. 4 is depicted as component (206a-i), (206b-i), ... (206z-i) in FIG. 2B.

The cap of FIG. 4 has one or more privacy switches (422). In one embodiment, the physical privacy switch (422) is a switch that assures users of privacy by disrupting a physical and/or electrical connection associated with the input sensor of the cap, for example, it electrically and/or physically disconnects all the microphones and/or cameras. The physical privacy switch (422) may be in the front face of the cap. The cap also comprises at least one sensor such as a microphone referred to herein as "(424)", here shown in FIG. 4 as a far-field microphone and/or microphone array of four microphones (424a), (424b), (424c), (424d). The cap may contain one or more cameras and/or light-sensing/heat-sensing sensors (not shown in FIG. 4). In one embodiment, the cap includes an indicator for feedback, for example, a visual indicator, an LED, or a multicolored LED ring (426). As described above, to improve usability of the cap in any room and improve aesthetics, the cap is designed to be low-profile, here shown to have a thickness of 4 mm (428) from its finished surface such as a finished wall surface.

The cap shown in FIG. 4 may be a modular system with an edge connector between the cap (206a-i) and body (206a-ii) that allows upgrades and/or different functionality for a given body using one or more caps. In one embodiment, the "edge connector" is a 30-pin analog/digital input/output connector to allow future flexibility in terms of the audio input devices such as a cap (206a-i) used. For example, a different architectural style and/or a different audio microphone array configuration may be used in a future cap (206a-i).

Premises Context and Session Context. As shown in FIG. 4, a first user may be in a room, say a kitchen, with audio cap (206b-i) and smart speaker system (214z), while a second user may be in a room, say a garage, with audio cap (206c-i) and smart speaker system (214a). The premises automation core (204) with two sets of stereo outputs is configured to simultaneously maintain a first session with the first user, a second session with the second user. Without limitation, a premises automation core (204) may have more than two sets of stereo outputs to support more simultaneous users, for example three outputs for three simultaneous users. The core (204) may do this by:

receiving and/or interpreting received audio in a premises context associated with the session with which it is associated, for example remembering that the first user is in the kitchen and may be referring to kitchen room functions. As referred to herein, a "premises context" is a set of context related to the physical space/room where input and/or output is received and may be associated with a specific human/user;

generating and/or sending responses to output in a premises context associated with the session with which it is associated, for example remembering that the second user is in the garage, routing the audio matrix switch (224) to the garage, and controlling devices in the garage; and/or maintaining premises context as a function of the session, the physical space/room, and/or the associated user, for example with voice recognition mapped to context for the first user, such as a voice recognition profile. As referred to herein, a "session context" is a set of context analogous to following a conversation between a human/user and the premises automation personality, including the premises context, associated human, and where in a time sequence the conversation is at currently.

Figure 5:
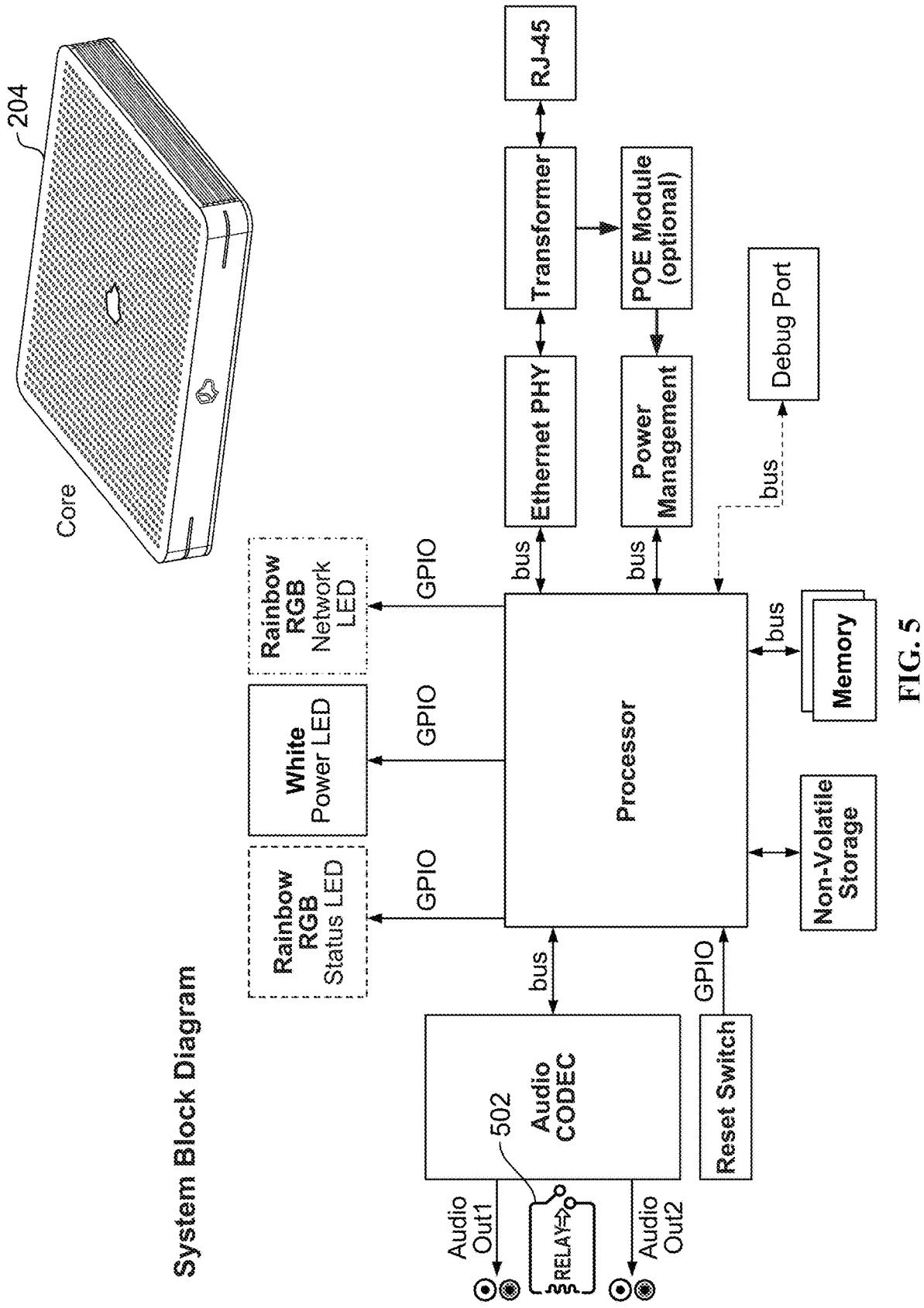
FIG. 5 is a block diagram illustrating an embodiment of a system for a premises automation core.

FIG. 5 is a block diagram illustrating an embodiment of a system for a premises automation core. In one embodiment, the block diagram of FIG. 5 is of the premises automation core (204) of FIG. 2A. The core (204) comprises at least one of the following: an RJ-45 connector, a transformer, an Ethernet PHY, an optional POE module, a power management subsystem, a processor, a status LED, a power LED, a network LED, memory, non-volatile storage, a debug port, a reset switch, and/or audio codec. The audio codec includes a physical relay (502).

Figure 6:
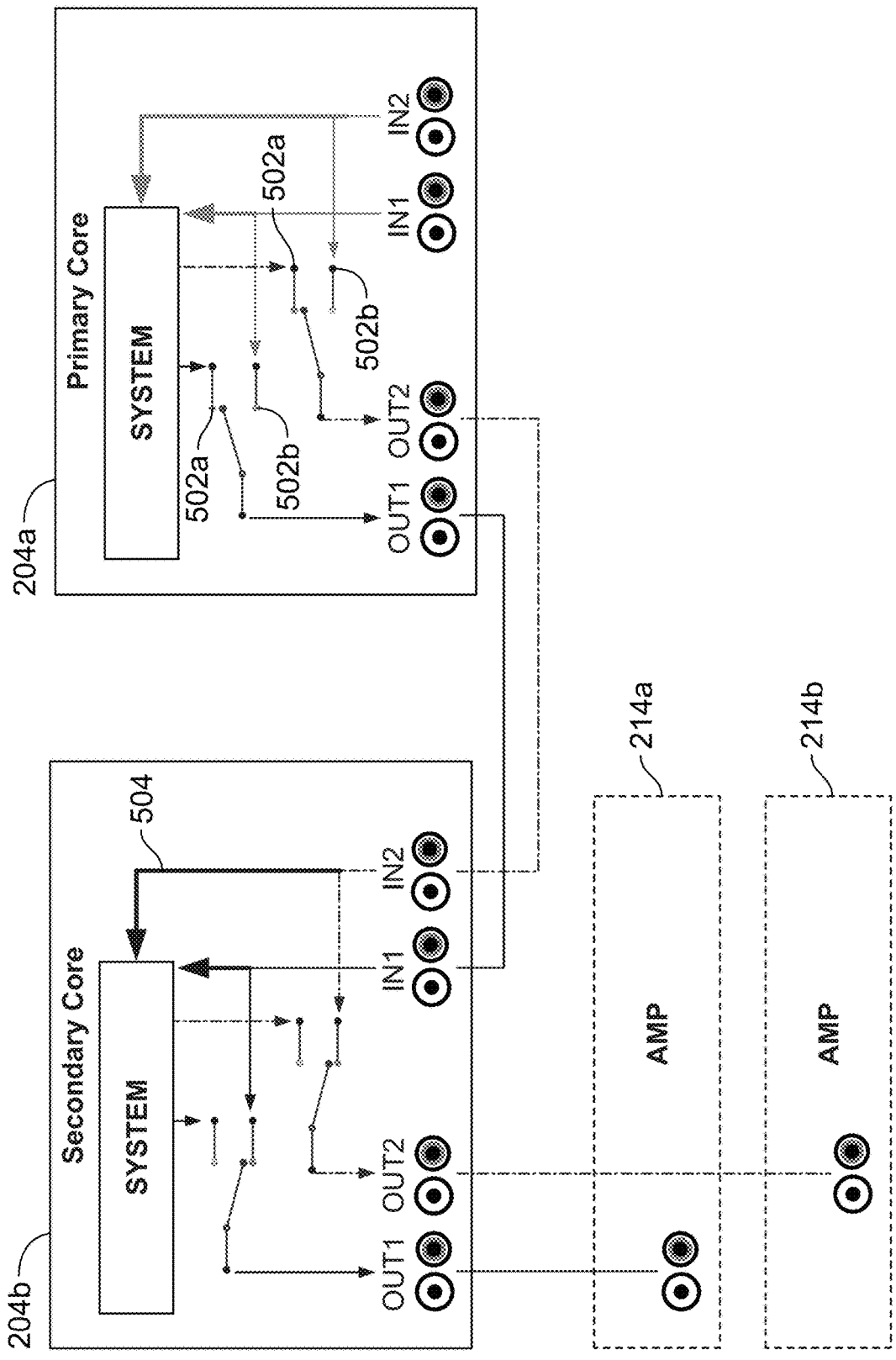
FIG. 6 is a diagram illustrating high availability feedback operation for a premises automation core.

FIG. 6 is a diagram illustrating high availability feedback operation for a premises automation core. In one embodiment, the two cores (204a), (204b) in FIG. 6 are both the premises automation core (204) of FIG. 2A.

Premises automation provides functionality that may be improved with high availability, for example for alarm systems, premises automation commands, and/or audio streaming/playback. As referred to herein, "high availability" refers to having a plurality of cores (204) such that if one core is inoperable the other core(s) can continue to provide feedback and/or core functionality to the system of FIG. 2A without any manual changes to hardware configuration.

In an embodiment shown in FIG. 6, audio channels may have a double input and double output; without limitation a person having ordinary skill in the art may extend the techniques disclosed to less or more inputs/outputs. Latching and/or electromechanical relays (502a), (502b) are used to reduce audio channel contention from more than one core. As shown in FIG. 6, one core is termed a "primary" core (204a) and another is a "secondary" core (204b).

Without limitation, a third "tertiary" core, "quaternary", and/or more cores may be added as well. Without limitation, other compatible systems such as a mini all-in-one/integrated premises automation system that encompass sensor/processor/feedback may also be considered a core during failover.

For the example in shown in FIG. 6, the primary core (204a) and secondary core (204b) use latching relays that have a system input mode (502a) and a system bypass mode (502b). The relays enforce a "one and only one driver" rule for driving the sound systems (214*a*), (214*b*) shown in FIG. 6. For example, during a power-on and/or boot-up situation, a given core may be in the system bypass mode (502*b*) to avoid two cores driving the input of sound systems (214*a*), (214*b*) at the same time.

In one embodiment, the core systems use a discovery phase/mechanism when one or more devices comes online on a given network for a premises automation system:
  When a first core system (204*a*) boots up on the network, it declares itself the 'primary' system and also associates itself as a 'master' system;
  When a second core system (204*b*) boots up on the network, it discovers a primary system exists and declares itself the 'secondary' system;
  If a third all-in-one system or core system (not shown in FIG. 6) boots up on the network, it discovers the primary and secondary system exists and declares itself the 'tertiary' system; and
  In the event the primary (204*a*) system suspends a 'heartbeat' or other system health mechanism, the secondary (204*b*) system will take over as 'master' including being the driver of the sound system (214*a*), (214*b*), as described further below. In one embodiment, other remediation may occur, for example the secondary (204*b*) system may attempt to reboot the primary (204*a*) system and/or re-detect the primary system's heartbeat. The secondary (204*b*) may remain the 'master' even when the primary (204*a*) system recovers.

In one embodiment, audio input and/or output devices are configured to discover a new premises automation core when its communication interface is networked to said devices, and wherein discovery includes a self-configuration to route-map audio to and from the new premises automation core.

In one embodiment, during a nominal scenario the primary core (204*a*) system uses its own relays in system input mode (502*a*) to drive the one or more outputs (shown to be two outputs in FIG. 6 for example), and audio cables physically couple the primary core (204*a*) to the secondary core (204*b*). During these times the secondary core (204*b*) has its own relays set to bypass mode (502*b*) with a system input shunt (504) activated so the secondary core can monitor the bypassed audio, and the amplifiers (214*a*), (214*b*) receive the driven output from the primary core (204*a*). In one embodiment, not shown in FIG. 6, instead of the amplifiers (214*a*), (214*b*), the cores (204*a*), (204*b*) drive the audio matrix (224). Note that the overall system will also work this way when the secondary core (204*b*) is not functioning, as all input is coming from the primary core (204*a*) and is considered 'master'.

In one embodiment, during a failover scenario the primary core (204*a*) is no longer functioning. In the event the primary core (204*a*) is not functioning, using the bypass shunt (504) the secondary core (204*b*) detects the primary core failure and activates its own latching relays to the system input mode (502*a*), which physically decouples the primary core (204*a*) and may decouple the shunt (504) as well. The secondary core (204*b*) then drives the amplifiers (214*a*), (214*b*), and/or matrix (224) and is considered 'master'. A further failure may occur where the primary and secondary cores are down in which case a tertiary device if available becomes the 'master'.

During nominal operation, premises automation state is partitioned into: durable metadata including user configurations, scene configurations and/or preferences; and current state including current room lighting levels, volume levels, and other premises automation device states. In one embodiment, as a new 'master' taking over during a failover scenario, it will inherit the durable metadata and query current state of premises-wide devices, for example the lighting levels in each room, volume levels, and so forth, to provide a seamless transition of 'master' to users on the premises.

Audio Channel Set. With existing audio devices using a distributed speaker set (214) as shown in FIGS. 2A and/or 2B, there may be audio already being played and/or streamed from a premises automation system or an unconnected third-party system.

In one embodiment, a "VoiceLink" protocol is used to interrupt existing audio streams/playback by disconnecting the existing stream from a premises automation core (204), for example one of two stereo outputs, and replacing the premises automation response and/or audio output for the speaker set (214), routing the audio through the matrix switch (224), and/or reconnecting the existing audio streams/playback. Using a VoiceLink protocol, a premises automation core (204) may 'path' audio using a matrix switch (224) to route audio to a given user and/or physical space. That is, the distributed system permits a virtually unlimited number of speakers for a single audio output channel using the VoiceLink and matrix switch (224). In one embodiment, this may track as a user listens to a favorite song and travels throughout the house, wherein the core (204) may direct music to each of the rooms associated with the user and/or session without necessarily communicating outside of the premises and/or the cloud.

In one embodiment, a "VoiceCast" protocol is used to control the existing audio streams/playback by reducing volume of the existing stream and/or mixing the premises automation response and/or audio output for the speaker set (214), then resuming the existing audio streams/playback. In the event the existing audio streams/playback are completely stopped, a pointer may be stored to allow resumption right at the point of interruption.

The VoiceCast protocol is indirectly routed through network enabled speakers, such as Sonos™ speakers which may communication over Ethernet and/or WiFi. Unlike with the VoiceLink protocol which may directly use a given number of physical audio ports such as two audio ports, the VoiceCast protocol may use network enabled speakers to increase the number of simultaneous sessions beyond, for example, two associated with two physical audio ports on the core (224). The VoiceCast protocol may then allow a virtually unlimited number of simultaneous sessions.

In the event of contention where the simultaneous users and/or sessions exceeds the available routing using the VoiceLink and VoiceCast protocols, for example a user walks from a VoiceCast physical space into a VoiceLink physical space, the core (224) may "dither" responses to maintain the impression of simultaneity to all users. As referred to herein, dithering responses may include shortening responses, delaying responses in time, and/or introducing pacing in responses so that each user may be reached in a reasonable amount of time across all VoiceLink and VoiceCast channels.

In one embodiment, a VoiceCast development kit such as a hardware development kit, firmware development kit, and/or software development kit (SDK) is made available as a de facto standard for external hardware to ensure devices are available VoiceCast destinations.

As referred to herein, a "session" is a context concept that starts with each conversation from a user to the core (224). The user may have multiple simultaneous sessions that may not include audio, for example using an iOS/Android app, using a computer portal, and using voice may constitute three simultaneous sessions from a user. Session context may include the user/user preferences and/or physical space/premises context.

Wake Word Reliability. The wake word is an intuitive/natural language technique to awaken the premises automation system for input. Traditionally, a single local device may be used to listen perpetually for the wake word using one or more microphones in the single local device. When a user utters a wake word, and the wake word is missed by the system, it delays the user from controlling or providing input to the premises automation system which may in some cases damage the premises or users. This scenario may be considered a 'false negative'. When a user does not utter a wake word, and the system is inadvertently awakened because it mistakenly believes the user did utter a wake word, it may cause the user to perceive an invasion of privacy or trigger inadvertently a premises automation command/input that the user did not intend. This scenario may be considered a 'false positive'.

Improved sensor reliability may be provided by allowing a sensor device such as the architectural audio cap (206a-i) and/or audio device body (206a-ii) of FIG. 2B, to detect a wake word and fine tuning the detection with a core device (204). Because of its architectural/smaller size, a sensor device (206a) may have a less powerful processor than core device (204).

In one embodiment, the sensor device (206a) is set to a more permissive and/or promiscuous listen mode that is biased to provide more false positives over false negatives. As referred to herein, this is a "weak detection" of a wake word. The audio data such as an audio stream once a wake word is detected by sensor device (206a) is then reprocessed by the core device (204) to verify and/or double check the same audio and reduce false positives. Redundant core devices (204) may also be used to triple check or further check/verify the same audio, either independently or as a co-processor and/or parallel processor. In the event both sensor device (206a) and core device(s) (204) agree a wake word has been uttered, the premises automation control system enters the phase of listening to the user input.

Figure 7:
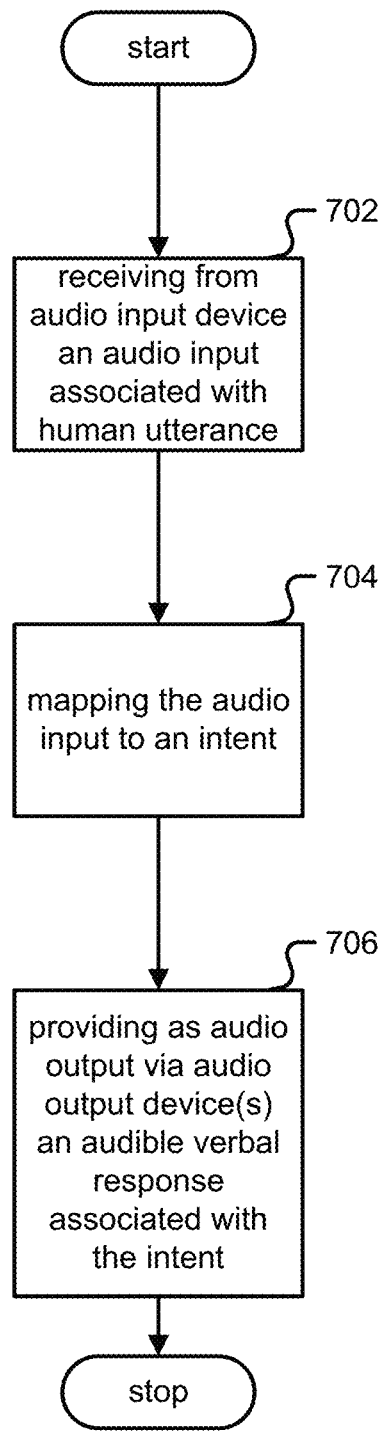
FIG. 7 is a flow diagram illustrating an embodiment of a process for maintaining premises control with a distributed architecture.

FIG. 7 is a flow diagram illustrating an embodiment of a process for maintaining premises control with a distributed architecture. In one embodiment, the premises automation core (204) of FIGS. 2A and/or 2B is used for the process in FIG. 7.

In step 702, an audio input associated with a human utterance is received from a respective one of a plurality of audio input devices. An example of an audio input device is an architectural cap (206a-i) as shown in FIG. 2B. For the plurality of audio input devices, each is located in a corresponding physical location within the premises, for example one or more in each room of a residential home suitable for user listening, such as the bedroom, kitchen, living room, and garage.

In step 704, the audio input is mapped to an intent. For example, if a user utters "good morning" from the bedroom, the audio input maps this to the intent of "execute good morning scene from bedroom". For example, if a user utters "turn off the lights" from the kitchen, the audio input maps this to the intent of "turn off all lights in the kitchen". For example, if a user utters "close the garage door" from the living room, the audio input maps this to the intent of "close the rollup door in the garage".

In step 706, audio output via a selected one or more of a plurality of audio output devices is provided an audible verbal response associated with the intent. An example of an audio output device is an amplifier (214a) and speaker (215a-i) in FIG. 2A, or a smart speaker system (214a) in FIG. 2B. Each of the plurality of audio output devices is located in an associated physical location within the premises, for example a mono speaker or a stereo pair in each room of a residential home suitable for user feedback, such as the bedroom, dining room, living room, bathroom, and patio.

For example, if a user utters "good morning" from the bedroom, the audible verbal response may be "good morning, Dave." For example, if a user utters "turn off the lights" from the kitchen, the audible verbal response may be "you got it, lights are now off." For example, if a user utters "close the garage door" from the living room, the audible verbal response may be "I'll close it right now."

In one embodiment, the premises automation core (204) is a primary premises automation core, and the premises automation system includes a secondary premises automation core. A durable state may be maintained between the primary premises automation core and the secondary premises automation core, wherein durable metadata including user configurations, scene configurations and/or preferences.

In one embodiment, an electromechanical failover subsystem comprising a latching relay is used to reduce audio channel contention from more than one core. As shown in FIG. 6, the electromechanical failover subsystem may require at most two additional physical connection pairs between the primary premises automation core and the secondary premises automation core, shown in FIG. 6 to be the first channel stereo pair between primary core (204a) "OUT1" and secondary core (204b) "IN1", and the second channel stereo pair between primary core "OUT2" and secondary core "IN2".

In one embodiment, the plurality of audio input devices is a plurality of microphones and/or microphone arrays. For example, for an architectural cap (206a-i) in FIG. 2B, an audio input device is the microphone array of (424a), (424b), (424c), and (424d) shown in FIG. 4.

In one embodiment, the selected one or more of the plurality of audio output devices comprises a routed audio output device associated with a physical location at which the audio input was received. As referred to herein, a "routed" audio output is one routed using (i) the audio matrix switch (224) via the VoiceLink protocol described herein, and/or (ii) using network enabled speakers via the VoiceCast protocol.

In one embodiment, the utterance is a wake word. In one embodiment, the wake word is weak detected at an audio input device (206a) and wherein the premises automation core (204) is further configured to verify the weak detected wake word.

In one embodiment, the utterance is a premises automation command. In one embodiment, the premises automation command is interpreted via a premises context. For example, if a user in the kitchen utters "turn off the lights in this room" to the audio input device in the kitchen, the premises automation core can use the premises context of being in the kitchen to interpret that the user wants the kitchen lights off. In one embodiment, the premises automation command is acknowledged via the audible verbal response, such as "lights in the kitchen now off, Dave."

In one embodiment, each of the plurality of audio input devices is configured to discover a new premises automation core when its communication interface is networked to each of the plurality of audio input devices, and wherein discovery includes a self-configuration to route-map sending audio to the new premises automation core.

In one embodiment, the utterance is associated with a first session in a first physical space, and the core maintains simultaneously the first session in the first physical space and a second session in a second physical space. In one embodiment, maintaining simultaneously the first session and the second session comprises receiving and interpreting received audio in a session context associated with a session with which it is associated.

In one embodiment, maintaining simultaneously the first session and the second session comprises generating and sending responses to output in a session context associated with a session with which it is associated.

In one embodiment, maintaining simultaneously the first session and the second session comprises maintaining a premises context, wherein the premises context is a function of an associated session, an associated physical space, and an associated user.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A distributed premises automation system, comprising:
   a plurality of audio input devices, each located in a corresponding physical location within the premises;
   a plurality of audio output devices, each located in an associated physical location within the premises;
   a premises automation core comprising:
      a communication interface;
      an audio codec comprising: a physical relay; a first channel stereo output; and a second channel stereo output; and
      a processor coupled to the communication interface and the audio codec, and configured to:
         receive via the communication interface, from a respective one of the plurality of audio input devices, an audio input associated with a human utterance received at the audio input device;
         map the audio input to an intent, wherein the intent comprises a home automation command associated with a home control output device controlling an aspect of a physical location;
         use the audio codec to provide as audio output via a selected one or more of the plurality of audio output devices an audible verbal response associated with the intent; and
         transmit via the communication interface, to the home control output device, a command associated with the intent.

2. The distributed premises automation system of claim 1, wherein the premises automation core is a primary premises automation core, and further comprising a secondary premises automation core.

3. The distributed premises automation system of claim 2, wherein a durable state is maintained between the primary premises automation core and the secondary premises automation core, comprising, in an event of primary premises automation core failure, an inheritance of durable metadata by the secondary premises automation core and a querying of current state of premises-wide devices by the secondary premises automation core.

4. The distributed premises automation system of claim 2, wherein an electromechanical failover subsystem comprising a latching relay is used to reduce audio channel contention from more than one core, comprising, in an event of primary premises automation core failure, switching from using a primary audio codec of the primary premises automation core to drive a given audio output device to using a secondary audio codec of the secondary premises automation core.

5. The distributed premises automation system of claim 4, wherein the electromechanical failover subsystem requires at most two additional physical connection pairs between the primary premises automation core and the secondary premises automation core, comprising the first channel stereo output; and the second channel stereo output.

6. The distributed premises automation system of claim 1, wherein the plurality of audio input devices is a plurality of microphones.

7. The distributed premises automation system of claim 1, wherein the plurality of audio output devices is a plurality of smart speakers.

8. The distributed premises automation system of claim 1, wherein the selected one or more of the plurality of audio output devices comprises a routed audio output device associated with a physical location at which the audio input was received.

9. The distributed premises automation system of claim 1, wherein the utterance is a wake word.

10. The distributed premises automation system of claim 9, wherein the wake word is weak detected at an audio input device and wherein the premises automation core is further configured to verify the weak detected wake word.

11. The distributed premises automation system of claim 1, wherein the utterance is a premises automation command.

12. The distributed premises automation system of claim 11, wherein the premises automation command is interpreted via a premises context.

13. The distributed premises automation system of claim 11, wherein the premises automation command is acknowledged via the audible verbal response.

14. The distributed premises automation system of claim 1, wherein each of the plurality of audio input devices is configured to discover a new premises automation core when its communication interface is networked to each of the plurality of audio input devices, and wherein discovery includes a self-configuration to route-map sending audio to the new premises automation core.

15. The distributed premises automation system of claim 1, wherein the utterance is associated with a first session in a first physical space, and the processor is further configured to maintain simultaneously the first session in the first physical space and a second session in a second physical space.

16. The distributed premises automation system of claim 15, wherein maintaining simultaneously the first session and the second session comprises receiving and interpreting received audio in a session context associated with a session with which it is associated.

17. The distributed premises automation system of claim 15, wherein maintaining simultaneously the first session and the second session comprises generating and sending responses to output in a session context associated with a session with which it is associated.

18. The distributed premises automation system of claim 15, wherein maintaining simultaneously the first session and the second session comprises maintaining a premises context, wherein the premises context is a function of an associated session, an associated physical space, and an associated user.

19. A method, comprising:
receiving from a respective one of a plurality of audio input devices, an audio input associated with a human utterance received at the audio input device;
wherein each of the plurality of audio input devices is located in a corresponding physical location within the premises;
mapping the audio input to an intent, wherein the intent comprises a home automation command associated with a home control output device controlling an aspect of a physical location;
using an audio codec to provide as audio output via a selected one or more of a plurality of audio output devices an audible verbal response associated with the intent;
wherein the audio codec comprises: a physical relay; a first channel stereo output; and a second channel stereo output;
wherein each of the plurality of audio output devices is located in an associated physical location within the premises; and
transmitting to the home control output device, a command associated with the intent.

20. A computer program product embodied in a non-transitory computer readable medium and comprising computer instructions for:
receiving from a respective one of a plurality of audio input devices, an audio input associated with a human utterance received at the audio input device;
wherein each of the plurality of audio input devices is located in a corresponding physical location within the premises;
mapping the audio input to an intent, wherein the intent comprises a home automation command associated with a home control output device controlling an aspect of a physical location;
using an audio codec to provide as audio output via a selected one or more of a plurality of audio output devices an audible verbal response associated with the intent;
wherein the audio codec comprises: a physical relay; a first channel stereo output; and a second channel stereo output;
wherein each of the plurality of audio output devices is located in an associated physical location within the premises; and
transmitting to the home control output device, a command associated with the intent.

* * * * *